(12) United States Patent
Shimamura et al.

(10) Patent No.: US 6,439,206 B1
(45) Date of Patent: Aug. 27, 2002

(54) FUEL EVAPORATIVE EMISSION CONTROLLER

(75) Inventors: Hiroshi Shimamura; Hiroshi Osaki, both of Sashima-gun (JP)

(73) Assignee: Kyosan Denki Co., Ltd., Sashima (JP)

( * ) Notice: Subject to any disclaimer, the term of this patent is extended or adjusted under 35 U.S.C. 154(b) by 0 days.

(21) Appl. No.: 09/705,874

(22) Filed: Nov. 6, 2000

(30) Foreign Application Priority Data

Nov. 12, 1999 (JP) .............................. 11-322371

(51) Int. Cl.[7] .............................................. F16K 24/04
(52) U.S. Cl. ........................ 123/516; 137/202; 137/43
(58) Field of Search .................... 137/43, 202, 587; 123/516, 518, 519

(56) References Cited

U.S. PATENT DOCUMENTS 3,586,015 A * 6/1971 Kitzner .......................... 137/43
5,443,561 A * 8/1995 Sakata et al. ................... 137/43
5,497,800 A * 3/1996 Ohashi et al. ................. 137/510
5,687,756 A * 11/1997 VanNatta ........................ 137/43
5,711,339 A * 1/1998 Kurihara ......................... 137/43
5,797,434 A * 8/1998 Benjey et al. .................. 137/43
6,240,950 B1 * 6/2001 Harris ........................... 137/202

OTHER PUBLICATIONS

"1999 Nissan Sentra Service Manual" EC–27.

* cited by examiner

*Primary Examiner*—Thomas N. Moulis
(74) *Attorney, Agent, or Firm*—Oliff & Berridge, PLC

(57) ABSTRACT

In the fuel evaporative emission controller, mounting of the piping is simplified, and the amount of piping such as rubber hoses is minimized, reducing the cost and the fuel permeation. The fuel evaporative emission controller includes a valve structure integrating a fuel-level sensing valve and a fuel cut valve. It further includes a vent line and an evaporate line both provided in the valve structure. In the fuel evaporative emission controller having the vent line connected to the canister, the valve structure has an opening for communicating the vent line and evaporate line with each other.

15 Claims, 18 Drawing Sheets

FUEL EVAPORATIVE EMISSION CONTROLLER

The disclosure of Japanese Patent Application No. HEI 11-322371 filed on Nov. 12, 1999 including the specification, drawings and abstract is incorporated herein by reference in its entirety.

BACKGROUND OF THE INVENTION

1. Field of the Invention

The invention relates to a fuel evaporative emission controller for preventing an evaporation gas in an automobile fuel tank from emitting into the air.

2. Description of Related Art

An automobile fuel tank is provided with valves, for example, a fuel-level sensing valve for closing a vent line when the tank is filled up with the fuel, a tank pressure control valve for maintaining the pressure in the fuel tank always at a predetermined value, a fuel cut valve for closing an evaporate line upon tilting and overturning of the automobile so as to prevent the fuel from flowing out through the evaporate line.

In a fuel evaporative emission controller as one related art shown in FIG. 17, a valve structure 4 formed by integrating a fuel-level sensing valve 2 and a fuel cut valve 3 is mounted to a fuel tank 1. The valve structure 4 is provided with a vent line 5 and an evaporate line 6, each of which leads to a canister 7.

The vent line 5 is provided with a diaphragm valve 8 that opens and closes the vent line 5 according to the pressure upon fuelling. The evaporate line 6 is provided with a tank pressure control valve 9 that opens and closes the evaporate line 6 according to the pressure in the fuel tank 1.

The tank pressure control valve 9 includes a mechanical valve that opens and closes according to a mechanically detected pressure (by means of fluid) in the fuel tank 1, and an electromagnetic valve that opens and closes according to an electrically detected pressure in the fuel tank 1. The electromagnetic valve is actuated by a pressure sensor 10 attached to the fuel tank 1. The pressure sensor 10 detects a pressure in the fuel tank 1.

Upon increase in the fuel-gas pressure in the fuel tank 1 at fuelling, the fuel gas flows through a valve seat 2A of the fuel-level sensing valve 2 provided in the valve structure 4, and opens the diaphragm valve 8 to enter the vent line 5 through a valve seat 8A as shown by arrow P of FIG. 17. Then, the fuel gas is discharged through the canister 7 into an inlet pipe (not shown) or the like.

When the fuel level in the fuel tank 1 becomes high, the fuel-level sensing valve 2 is lifted to close the valve seat 2A, preventing the fuel from being directly fed to the canister 7.

Normally, when the fuel-gas pressure in the fuel tank 1 remains high, the fuel-level sensing valve 2 is fixed to the valve seat 2 A to keep the vent line 5 closed. The pressure in the fuel tank 1 can be reduced by opening the tank pressure control valve 9 provided in the evaporate line 6 to introduce the atmospheric pressure into the fuel tank 1 through the canister 7. As a result, the fuel-level sensing valve 2 drops due to the self-weight, thus opening the vent line 5.

In the case where a vehicle is excessively tilted or overturned, a large quantity of fuel in the fuel tank 1 may possibly flow out through the evaporate line 6 into the canister 7. The outflow of the fuel may be prevented by the fuel cut valve 3 that lifts up to close a valve seat 3A.

Hereinafter, a fuel evaporative emission controller of another related art will be described with reference to FIG. 18.

Like elements are denoted with like reference numerals and codes, and description thereof will be omitted.

In the fuel evaporative emission controller of FIG. 18, the fuel cut valve 3 is provided separately from the valve structure 4.

This controller has problems as described below.

First, since the vent line 5 and evaporate line 6 are connected to the canister 7 through the piping such as rubber hoses, a long assembling time is required, and the cost is increased because of additional parts such as rubber hoses.

Moreover, due to the strict regulation on evaporative emission in recent years, permeation of the fuel gas through the valves and piping such as rubber hoses has become a major concern.

Accordingly, it is not preferable to arrange the complex piping and to form a large opening in the fuel tank in terms of escape of the fuel gas.

Moreover, in the above-mentioned controller, the fuel-level sensing valve 2, fuel cut valve 3 and pressure sensor 10 are mounted to the upper wall of the fuel tank by means of a rubber O-ring 11 and the like. Therefore, the evaporation gas permeates through the O-ring 11 into the outside.

SUMMARY OF THE INVENTION

It is one object of the invention to provide a fuel evaporative emission controller that simplifies piping mount, achieves cost reduction by minimizing piping like rubber hoses, and reduces the fuel gas permeation.

In order to achieve this object, the fuel evaporative emission controller of the invention includes a valve structure having at least a fuel-level sensing valve and a first fuel cut valve. The valve structure also includes a vent line provided in the valve structure and an evaporate line provided in the valve structure. The vent line and the evaporate line is communicated with each other within the valve structure.

Since the piping like rubber hoses and the number of joints can be minimized, the assembling time as well as the cost for providing the rubber hoses and the like can be reduced.

BRIEF DESCRIPTION OF THE DRAWINGS

Various exemplary embodiments of the invention will be described with reference to the accompanying drawings, in which like numerals are used to represent like elements and wherein.

DETAILED DESCRIPTION OF THE PREFERRED EMBODIMENTS

Figure 1:
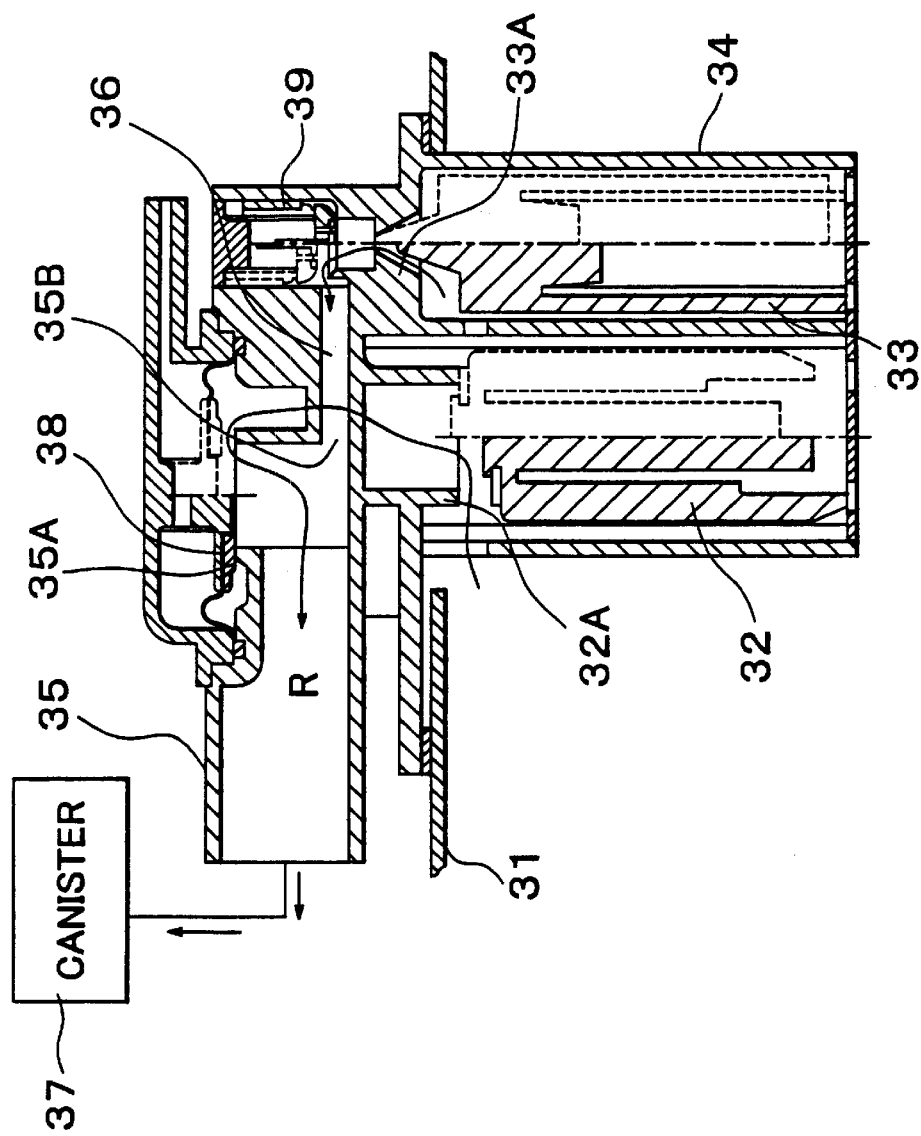
FIG. 1 is a cross sectional view of a fuel evaporative emission controller according to Embodiment 1 of the invention.

Hereinafter, embodiments of the invention will be described with reference to the accompanying drawings.

First, Embodiment 1 of the invention is described with reference to FIG. 1.

A valve structure 34 including a fuel-level sensing valve 32 and a fuel cut valve 33 is mounted to a fuel tank 31. The valve structure 34 is further provided with a vent line 35 and an evaporate line 36. The vent line 35 and evaporate line 36 communicate with each other through an opening 35B, and the vent line 35 leads to a canister 37.

The vent line 35 is provided with a diaphragm valve 38. The evaporate line 36 is provided with a tank pressure control valve 39. The tank pressure control valve 39 is a mechanical valve.

When the fuel-gas pressure in the fuel tank 31 is raised upon fuelling, the fuel gas flows through a valve seat 32A of the fuel-level sensing valve 32 provided in the valve structure 34, and opens the diaphragm valve 38 to enter the vent line 35 through a valve seat 35A, as shown by arrow R in the drawing. Then, the fuel gas is discharged through the canister 37 into an inlet pipe (not shown) or the like.

When the fuel level in the fuel tank 31 rises, the fuel-level sensing valve 32 is lifted to close the valve seat 32A. Thus, the fuel is prevented from being directly fed to the canister 37.

When the fuel-gas pressure in the fuel tank 31 remains high, the fuel-level sensing valve 32 is fixed to the valve seat 32A, so that the vent line 35 is left closed. Therefore, the pressure in the fuel tank 31 must be reduced. In such a case, the tank pressure control valve 39 provided in the evaporate line 36 is opened to introduce the atmospheric pressure into the fuel tank 31 through the canister 37. As a result, the fuel-level sensing valve 32 drops due to the self-weight so that the vent line 35 can be opened. The tank pressure control valve 39 is a two-way valve that is opened to feed the fuel gas into the canister 37 when the pressure in the fuel tank 31 rises, and is opened to introduce the atmospheric pressure into the fuel tank 31 when the pressure in the fuel tank 31 falls.

In the case where the automobile is excessively tilted or overturned, the fuel cut valve 33 is lifted to close a valve seat 33A, thus preventing a large quantity of the fuel from flowing out.

According to this embodiment, the vent line 35 and evaporate line 36 do not have to be connected to the canister 37 through the piping such as rubber hoses. Therefore, the assembling time as well as the use of the rubber hoses and the like are reduced, leading to cost reduction.

Moreover, since complex and massive piping is not necessary, the quantity of fuel gas passing therethrough is reduced. Furthermore, unlike separate mounting of each valve to the fuel tank, the structure as integration of the fuel-level sensing valve 32, fuel cut valve 33 and the tank pressure control valve 39 is mounted to the fuel tank 31, the number of openings formed in the fuel tank is reduced. This may also reduce permeation of the fuel gas.

Figure 2:
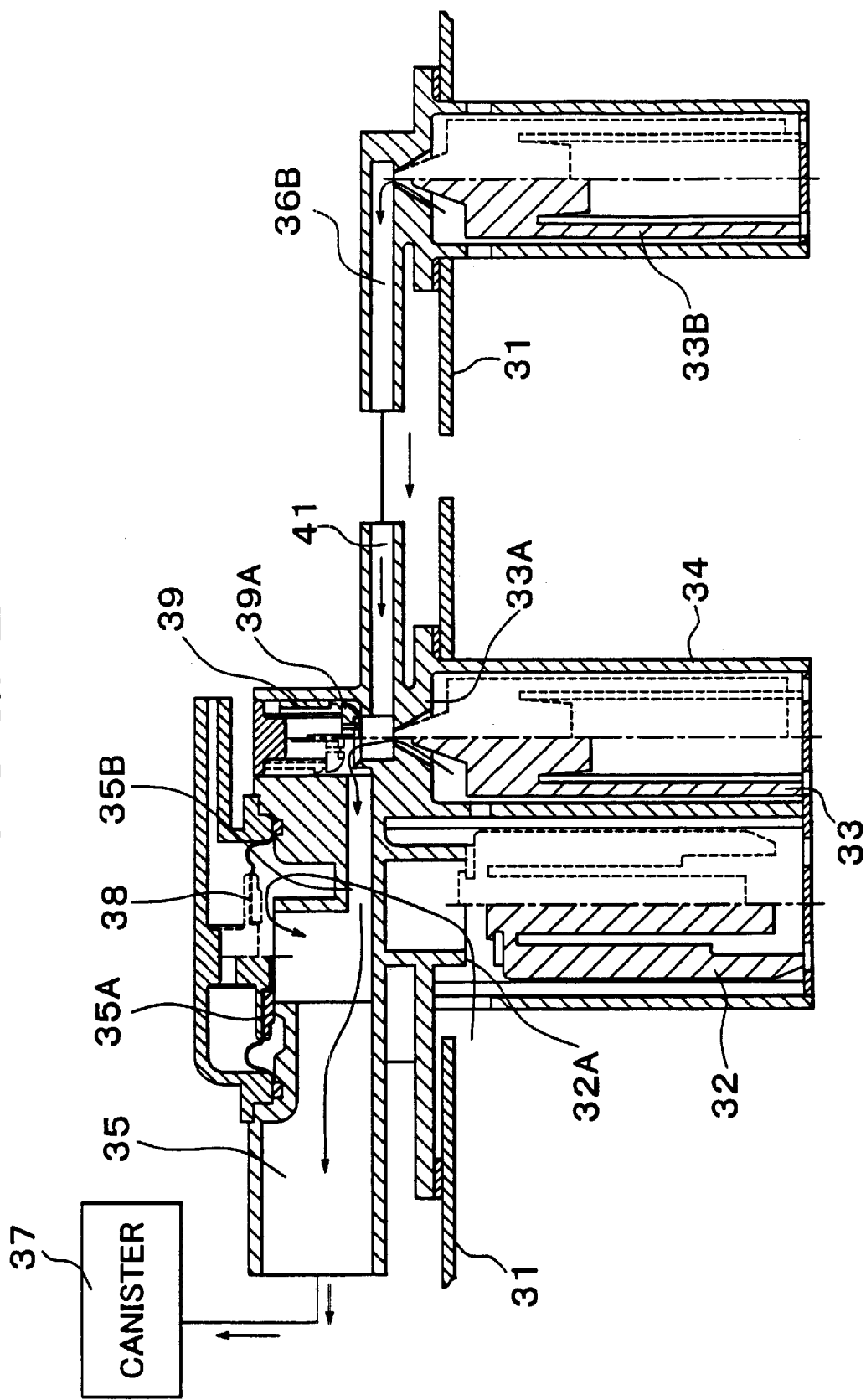
FIG. 2 is a cross sectional view of a fuel evaporative emission controller according to Embodiment 2 of the invention.

In addition to the components of Embodiment 1, a separately placed fuel cut valve 33B may be provided as in Embodiment 2 shown in FIG. 2. In Embodiment 2, the valve structure 34 has a connection port 41 that is formed between the valve seat 33A of the fuel cut valve 33 and a valve seat 39A of the tank pressure control valve 39. The connection port 41 communicates with an evaporate line 36B of the separately provided fuel cut valve 33B so as to maintain the pressure in the fuel tank 31 at a predetermined pressure, and also conducts the fuel cut upon tilting and overturning of the automobile.

Since the structure other than that described above is the same as that of Embodiment 1 shown in FIG. 1, like components are denoted with like reference numerals and codes, and description thereof will be omitted. In the following description as well, like components are denoted with like reference numerals and codes, and description thereof will be omitted.

In the above-described Embodiments 1 and 2, a mechanical control valve that is opened and closed according to a fluid pressure such as fuel-gas pressure and atmospheric pressure is used as the tank pressure control valve. Alternatively, however, an electromagnetic valve may be used.

Figure 3:
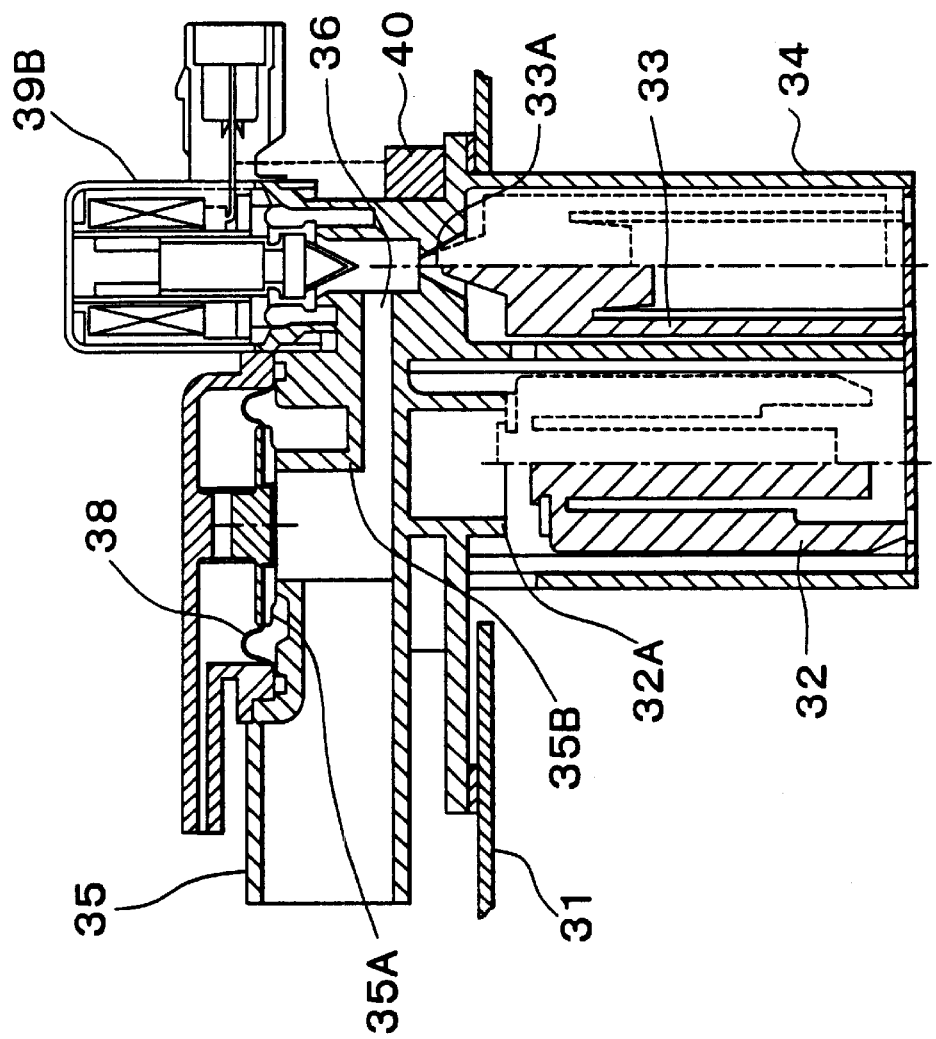
FIG. 3 is a cross sectional view of a fuel evaporative emission controller according to Embodiment 3 of the invention.

In Embodiment 3 shown in FIG. 3, the tank pressure control valve 39 of Embodiment 1 is replaced with an electromagnetic valve 39B. The electromagnetic valve 39B is opened and closed according to a signal of a pressure sensor 40 provided at the fuel tank 31.

Similarly, in Embodiment 2 shown in FIG. 2, the tank pressure control valve 39 may be replaced with an electromagnetic valve 39C.

Figure 4:
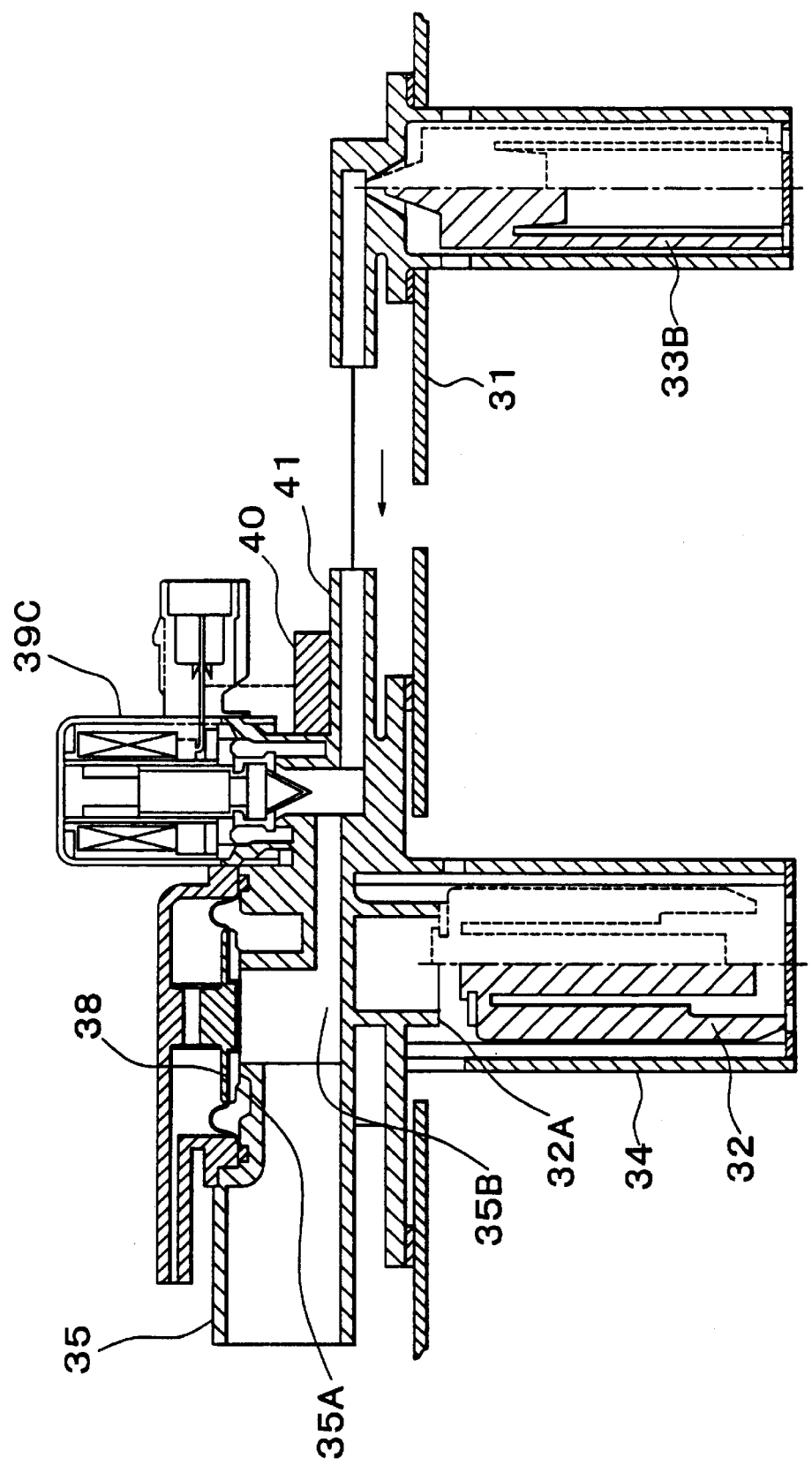
FIG. 4 is a cross sectional view of a fuel evaporative emission controller according to Embodiment 4 of the invention.

In Embodiment 4 shown in FIG. 4, the fuel cut valve is a separate member that is placed separately from the valve structure. Moreover, the tank pressure control valve 39 of Embodiment 2 is replaced with the electromagnetic valve 39C. The connection port 41 is formed integrally with the valve structure 34, so that the fuel evaporation gas from the separately placed fuel cut valve 33B is introduced into the evaporate line 36 through the connection port 41.

Figure 5:
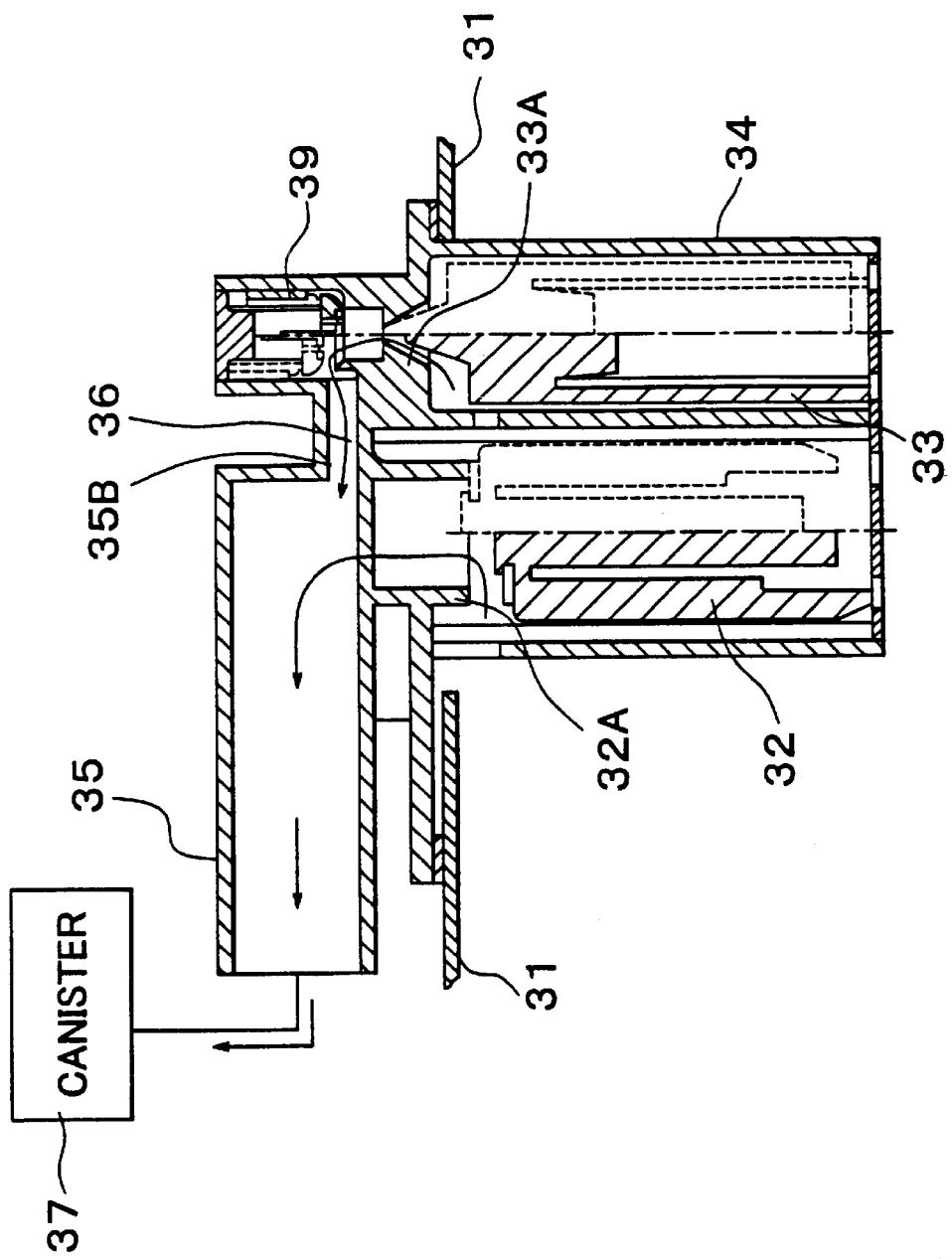
FIG. 5 is a cross sectional view of a fuel evaporative emission controller according to Embodiment 5 of the invention.
Figure 6:
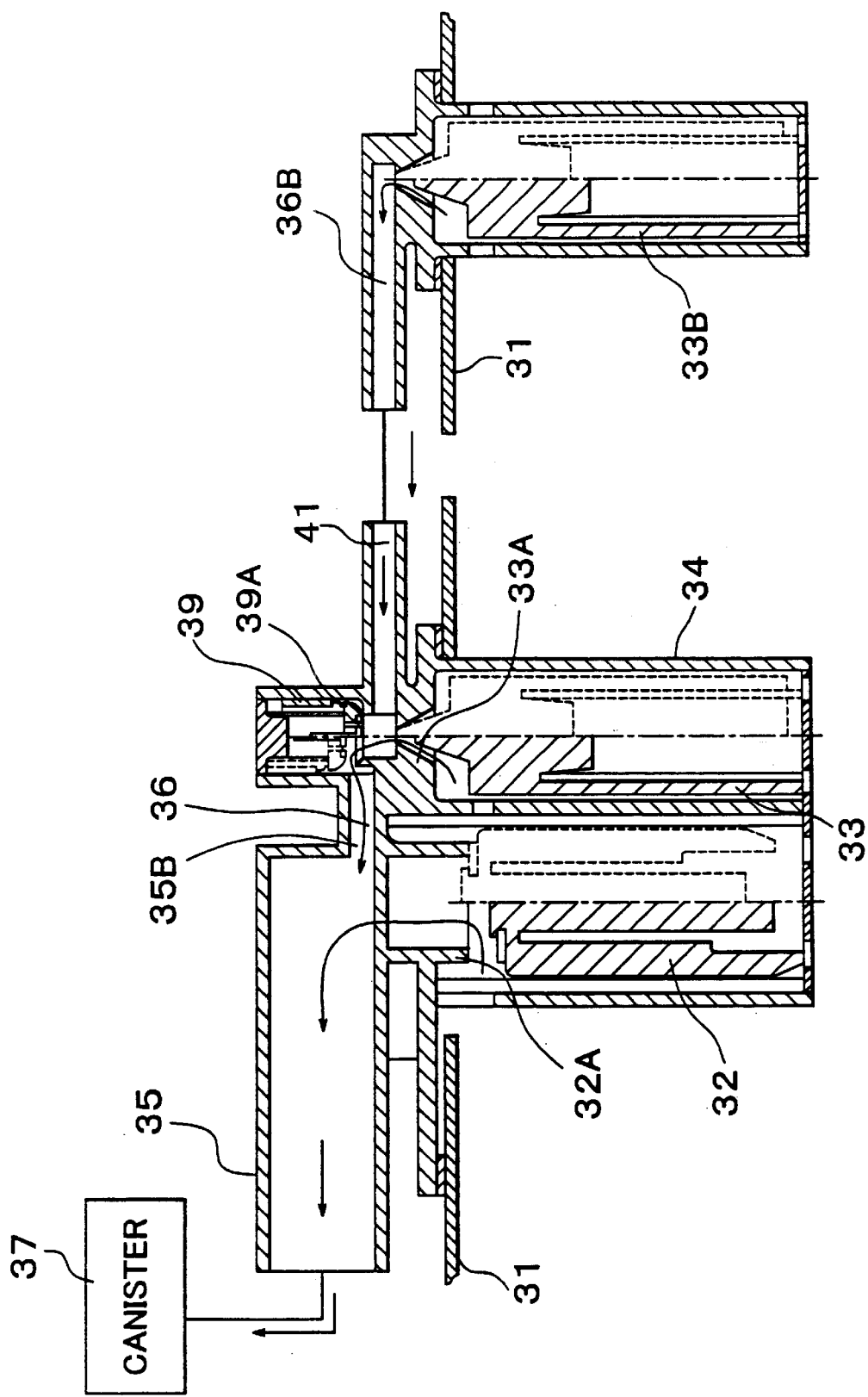
FIG. 6 is a cross sectional view of a fuel evaporative emission controller according to Embodiment 6 of the invention.

In Embodiments 5 and 6 shown in FIGS. 5 and 6, the diaphragm valves 38 of Embodiments 1 and 2 shown in FIGS. 1 and 2 are omitted, respectively. In this case, the fuel tank 31 is always in communication with the canister 37. However, such a structure does not have any particular adverse effects.

Instead of the mechanical valve, an electromagnetic valve may be used as the fuel tank pressure control valve 39.

Figure 7:
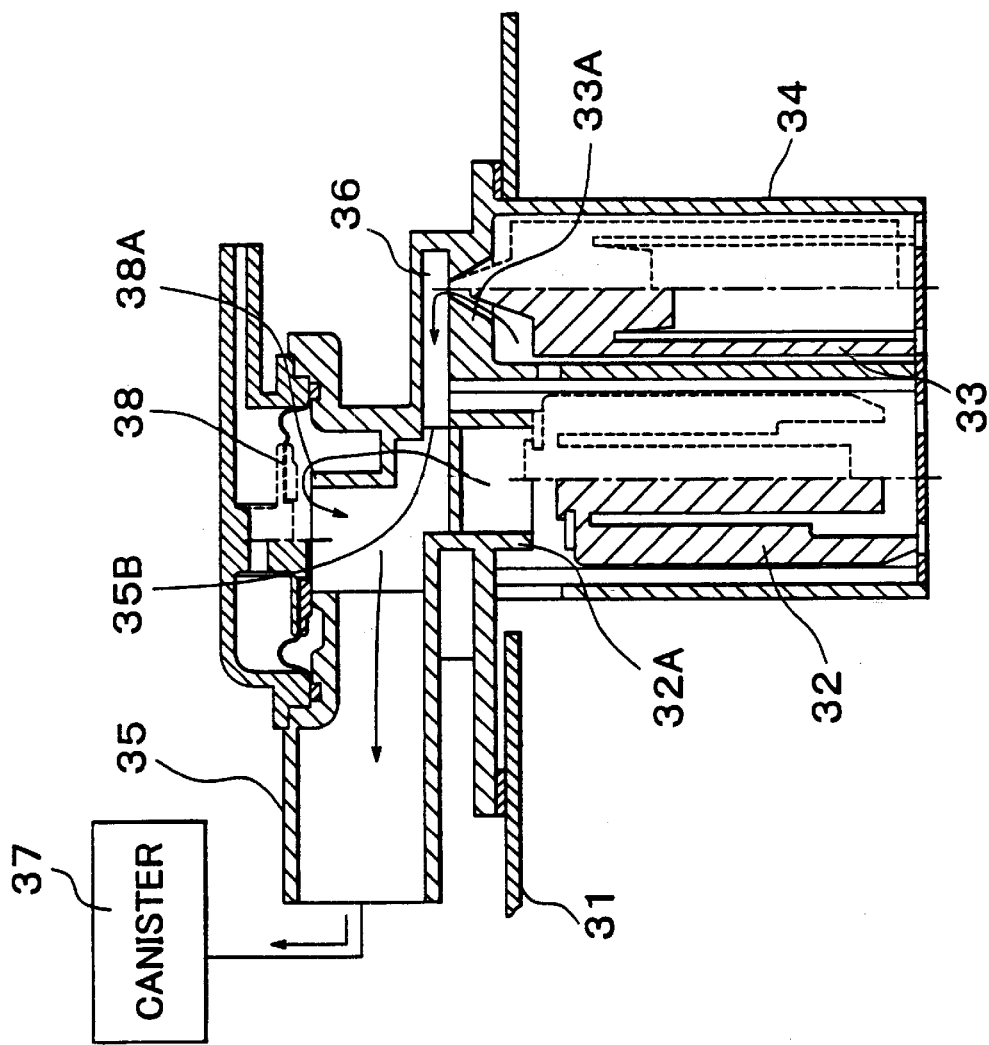
FIG. 7 is a cross sectional view of a fuel evaporative emission controller according to Embodiment 7 of the invention.
Figure 8:
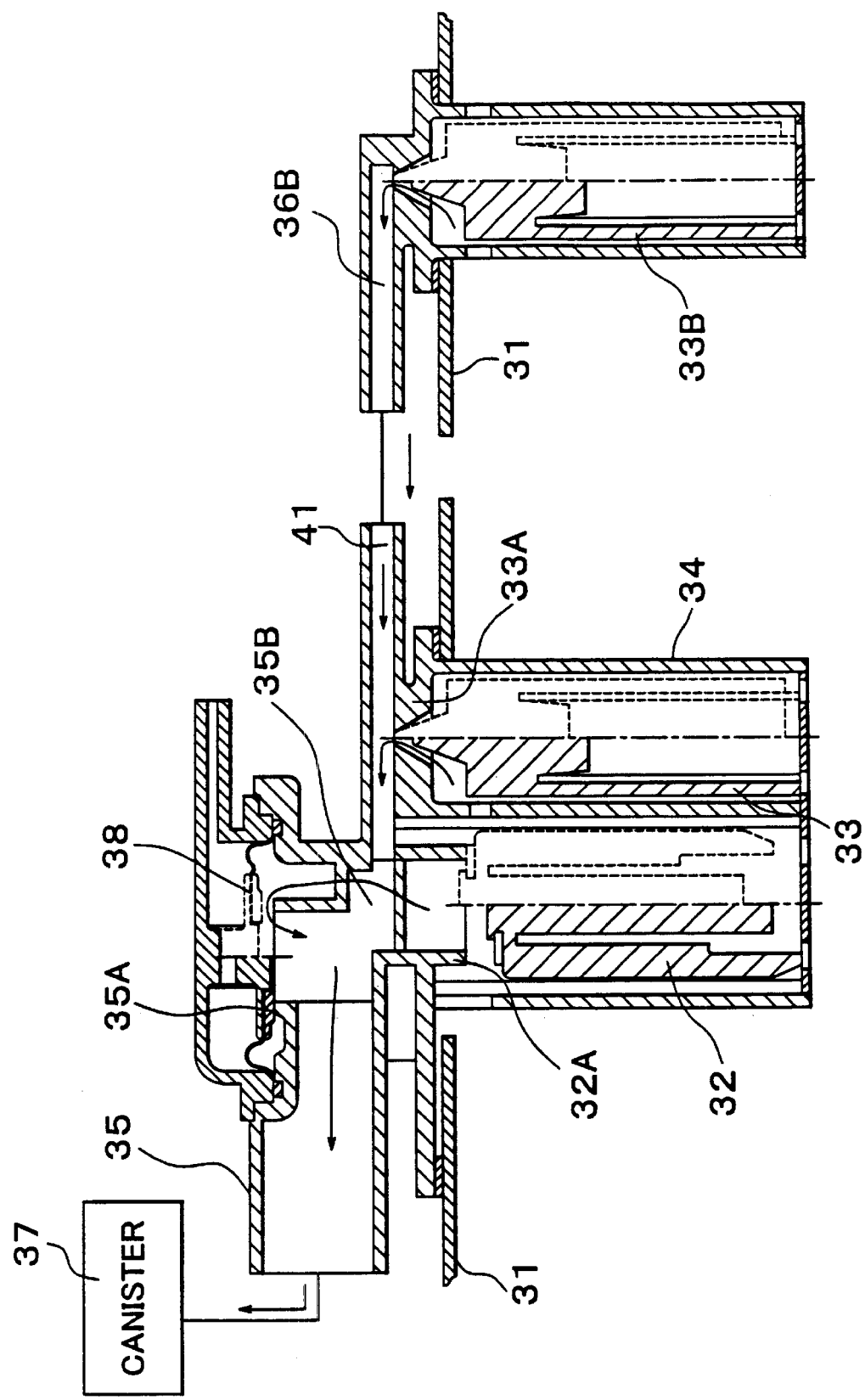
FIG. 8 is a cross sectional view of a fuel evaporative emission controller according to Embodiment 8 of the invention.

Each of the fuel evaporative emission controllers according to the above-described Embodiments 1 to 6 includes the fuel tank pressure control valve 39 (39B, 39C). However, the fuel tank pressure control valve may be omitted as in Embodiments 7 and 8 respectively shown in FIGS. 7 and 8. In this case, the fuel tank 31 is always in communication with the canister 37 through the evaporate line 36. However, such a structure does not have any particular adverse effects.

Figure 9:
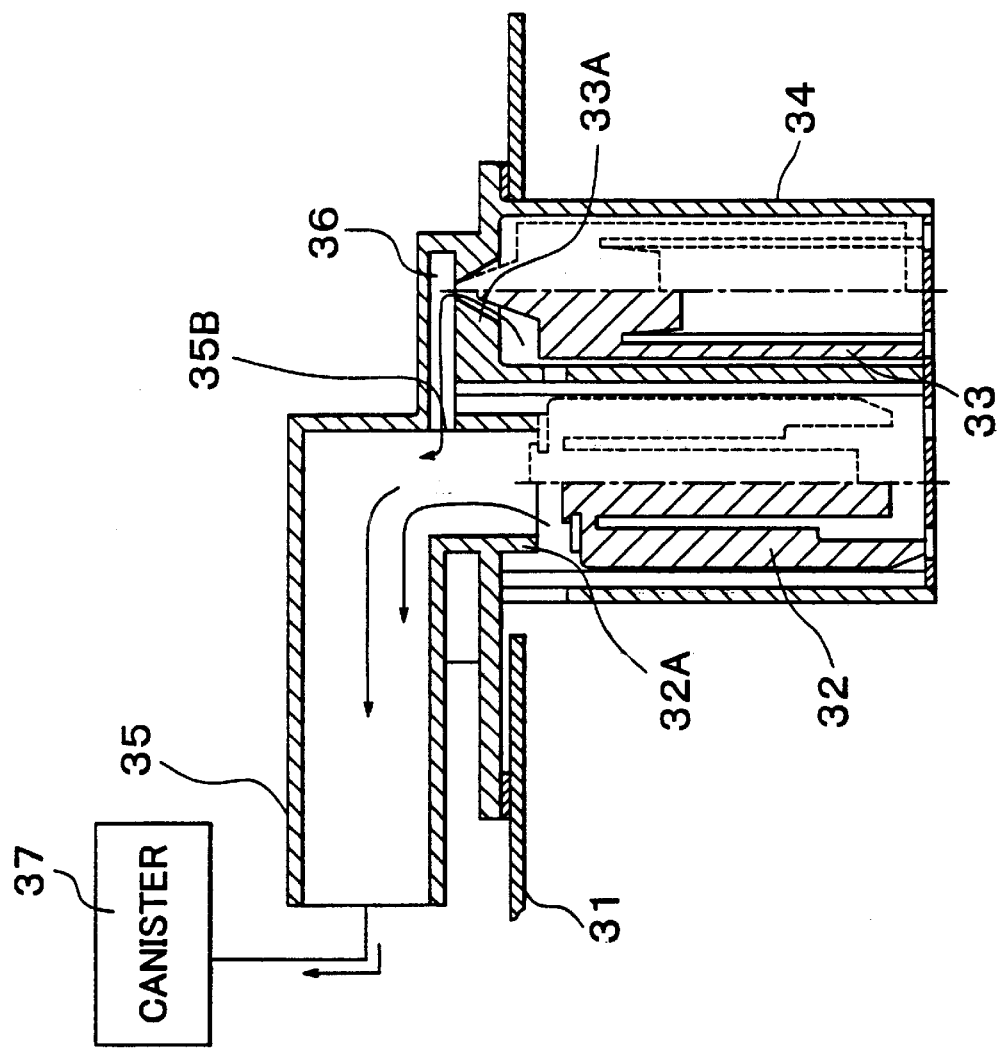
FIG. 9 is a cross sectional view of a fuel evaporative emission controller according to Embodiment 9 of the invention.
Figure 10:
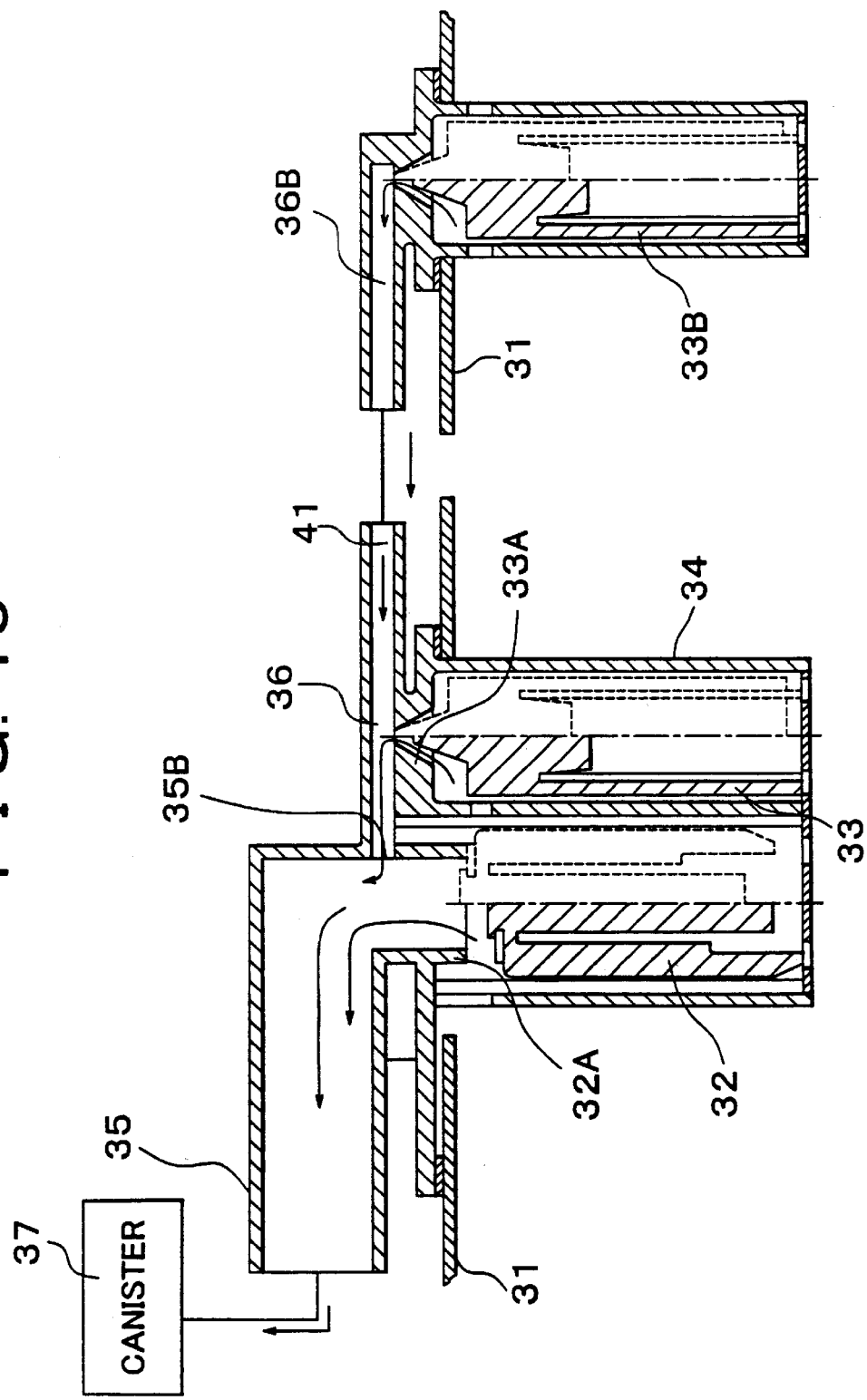
FIG. 10 is a cross sectional view of a fuel evaporative emission controller according to Embodiment 10 of the invention.

Moreover, the diaphragm valves 38 of Embodiments 7 and 8 may be omitted as in Embodiments 9 and 10 shown in FIGS. 9 and 10, respectively.

According to the structure of the invention, the vent line is integrated with the evaporate line. Therefore, a large quantity of evaporation gas passes through the vent line, whereby a large quantity of liquid fuel may possibly be accumulated in the vent line. Thus, as in Embodiment 11 shown in FIG. 11, the vent line 35 may have a recessed fuel-collecting portion 42. The fuel-collecting portion 42 has a dropping hole 43 through which the fuel drops into the fuel tank 31.

According to the structure of Embodiment 11, the fuel accumulated in the vent line 35 is returned into the fuel tank 31. Therefore, the accumulated fuel is not fed into the canister 37. Thus, deterioration of the canister 37 due to the fuel is prevented, whereby durability can be improved.

Since the dropping hole 43 makes the pressure in the valve seat 32A of the fuel-level sensing valve 32 equal to the pressure in the vent line 35, the fuel-level sensing valve 32 is prevented from being fixed to the valve seat 32A.

Figure 11:
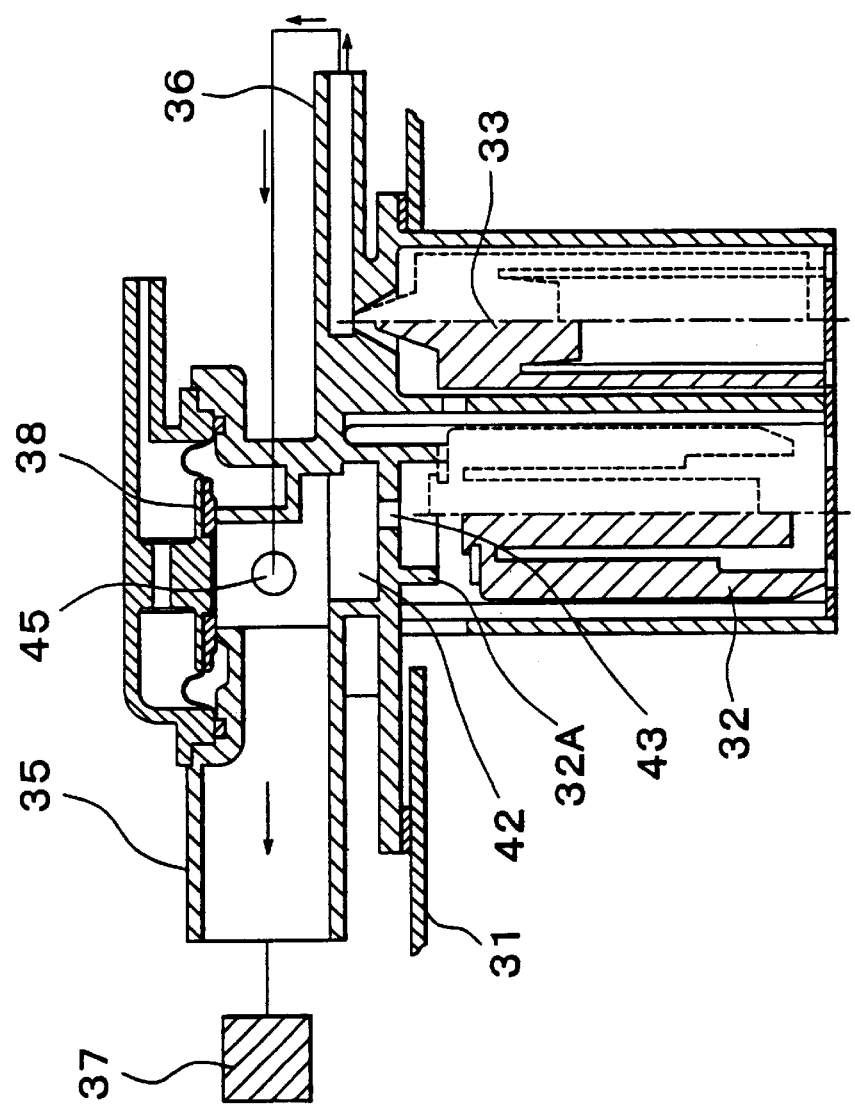
FIG. 11 is a cross sectional view of a fuel evaporative emission controller according to Embodiment 11 of the invention.
Figure 12:
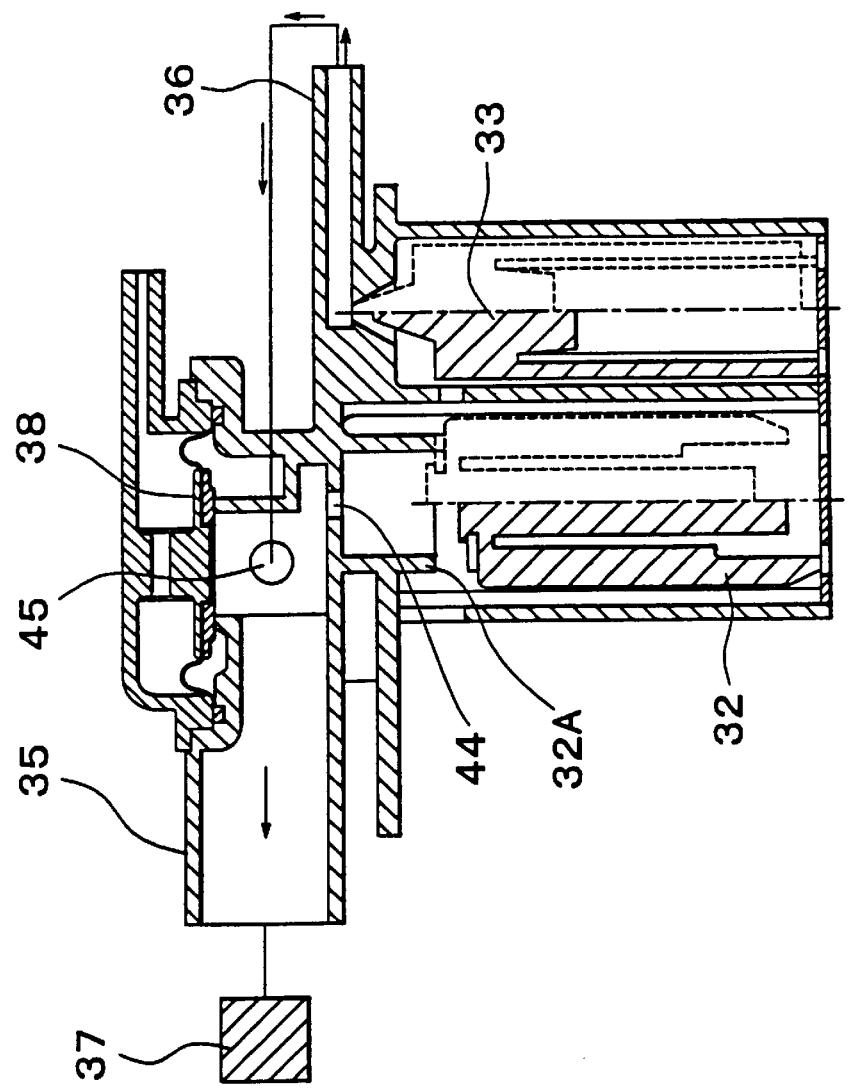
FIG. 12 is a cross sectional view of a fuel evaporative emission controller according to Embodiment 12 of the invention.

As in Embodiment 12 shown in FIG. 12, the fuel-collecting portion may be eliminated, and only a communication hole 44 for making the vent line 35 communicate with the valve seat 32A located above the fuel-level sensing valve 32 may be formed instead. This structure can also prevent the fuel-level sensing valve 32 from being fixed to the valve seat 32A. In the structures of FIGS. 11 and 12, the evaporate line 36 extends outside the valve structure 34 into the vent line 35 through an opening 45. However, as in the foregoing embodiments, the evaporate line 36 may extend within the valve structure 34 directly into the vent line 35.

Figure 13:
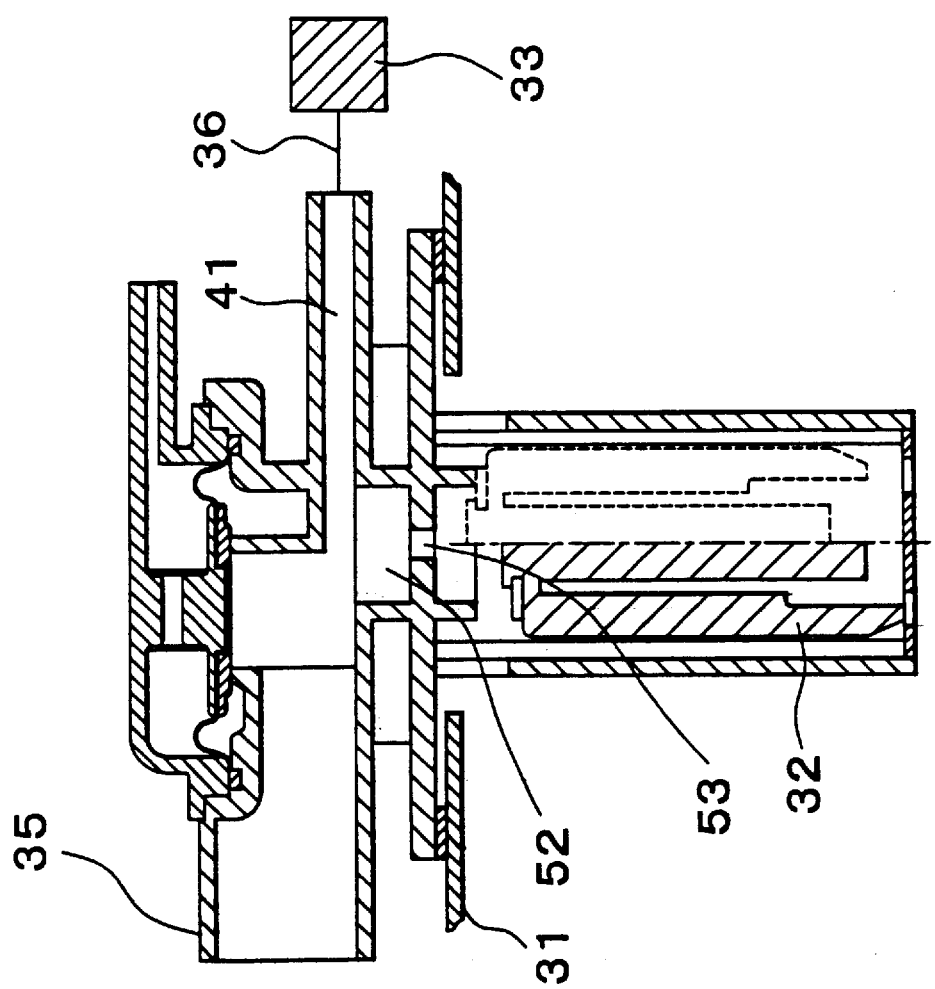
FIG. 13 is a cross sectional view of a fuel evaporative emission controller according to Embodiment 13 of the invention.

FIG. 13 shows Embodiment 13 of the invention. In Embodiment 13, the valve structure has a fuel-collecting portion and a dropping hole. In this embodiment, the fuel-level sensing valve 32 and fuel cut valve 33 are provided separately from each other. The evaporate line 36 of the fuel cut valve 33 leads to the connection port 41 of the fuel-level sensing valve 32, and the connection port 41 in turn communicates with the vent line 35. The vent line 35 has a recessed fuel-collecting portion 52. The fuel-collecting portion 52 has a dropping hole 53 through which the fuel drops into the fuel tank 31.

Figure 14:
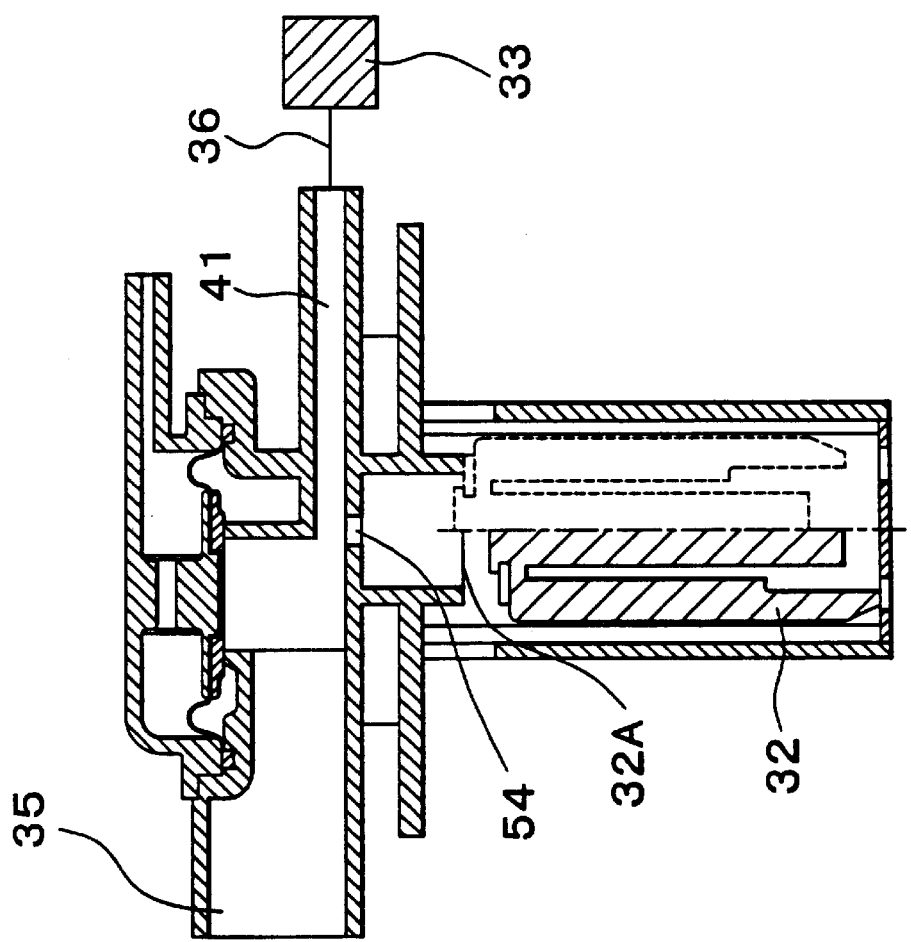
FIG. 14 is a cross sectional view of a fuel evaporative emission controller according to Embodiment 14 of the invention.

In order to merely prevent the fuel-level sensing valve 32 from being fixed to the valve seat 32A, the fuel-collecting portion may be eliminated, and only a communication hole 54 for making the vent line 35 communicate with the valve seat 32A located above the fuel-level sensing valve 32 may be formed instead, as in Embodiment 14 shown in FIG. 14. This structure can also make the pressure in the valve seat 32A equal to the pressure in the vent line 35, whereby the fuel-level sensing valve 32 can be prevented from being fixed to the valve seat 32A.

In Embodiments 13 and 14, the evaporate line 36 extends from the separately provided fuel cut valve 33 into the vent line 35 through the connection port 41.

Note that, in the case where the fuel cut valve 33 is provided separately from the valve structure 34 in the foregoing embodiments, a plurality of fuel cut valves 33 may be provided.

Figure 15:
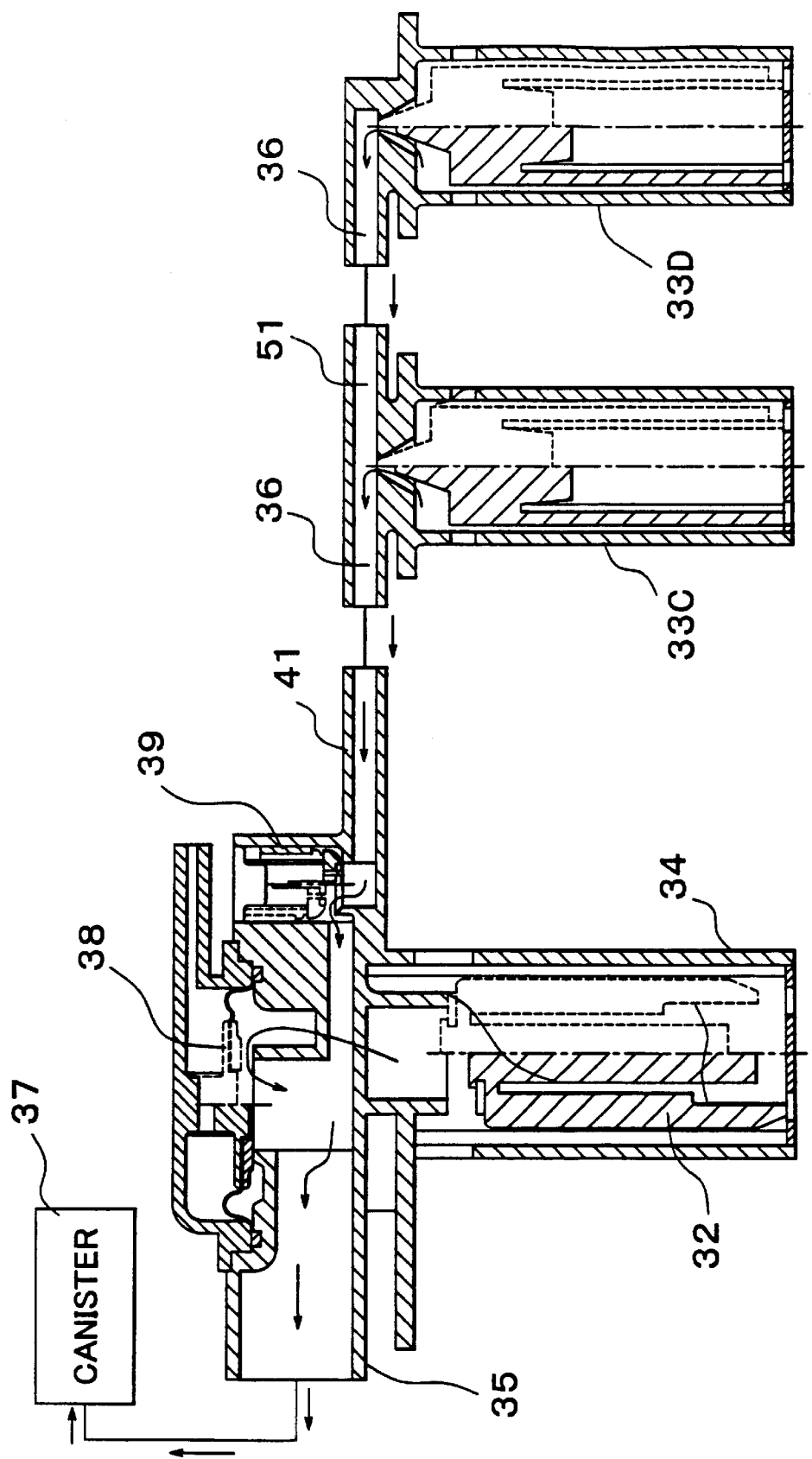
FIG. 15 is a cross sectional view of a fuel evaporative emission controller according to Embodiment 15 of the invention.
Figure 16:
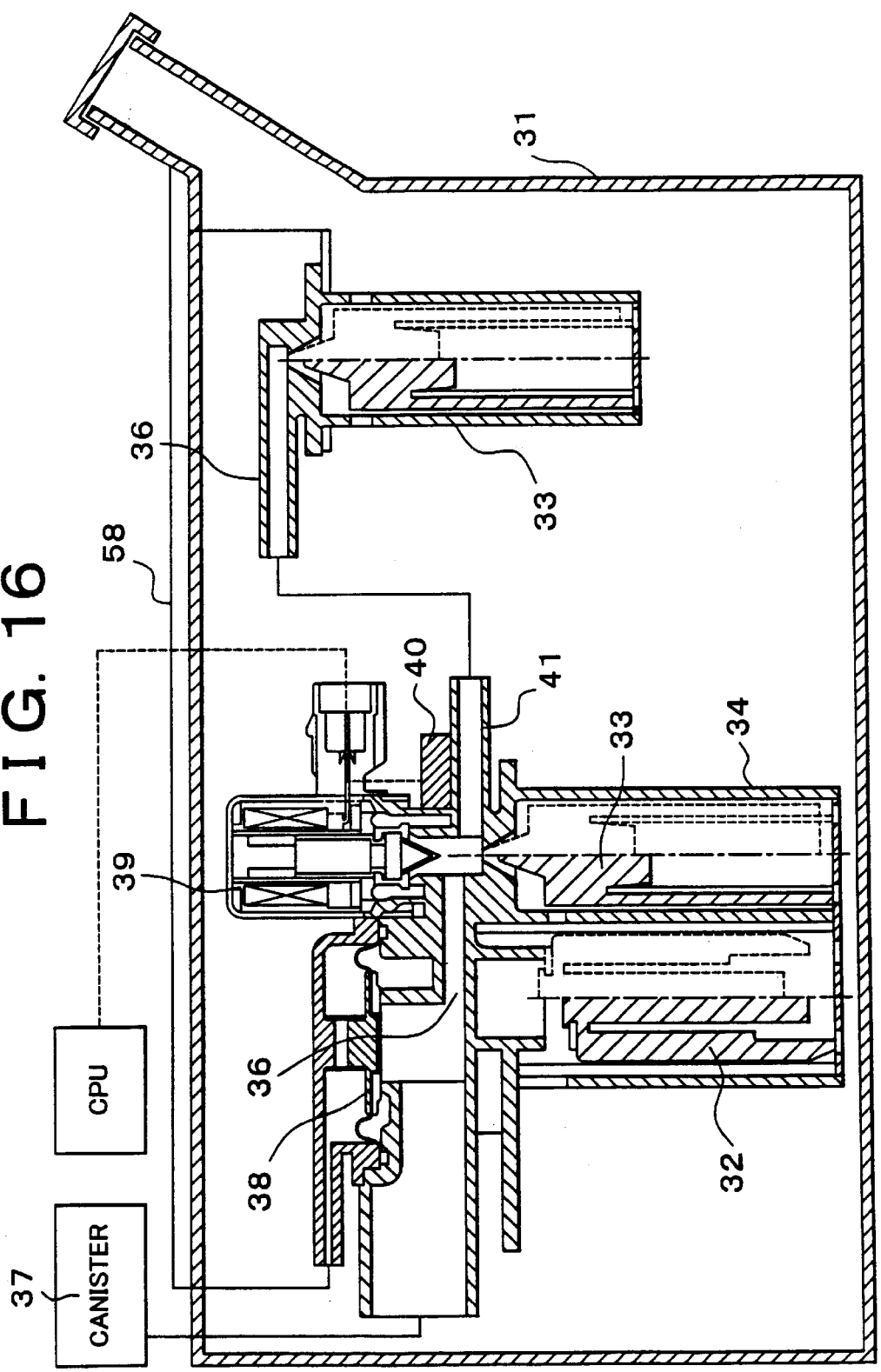
FIG. 16 is a cross sectional view of a fuel evaporative emission controller according to Embodiment 16 of the invention.
Figure 17:
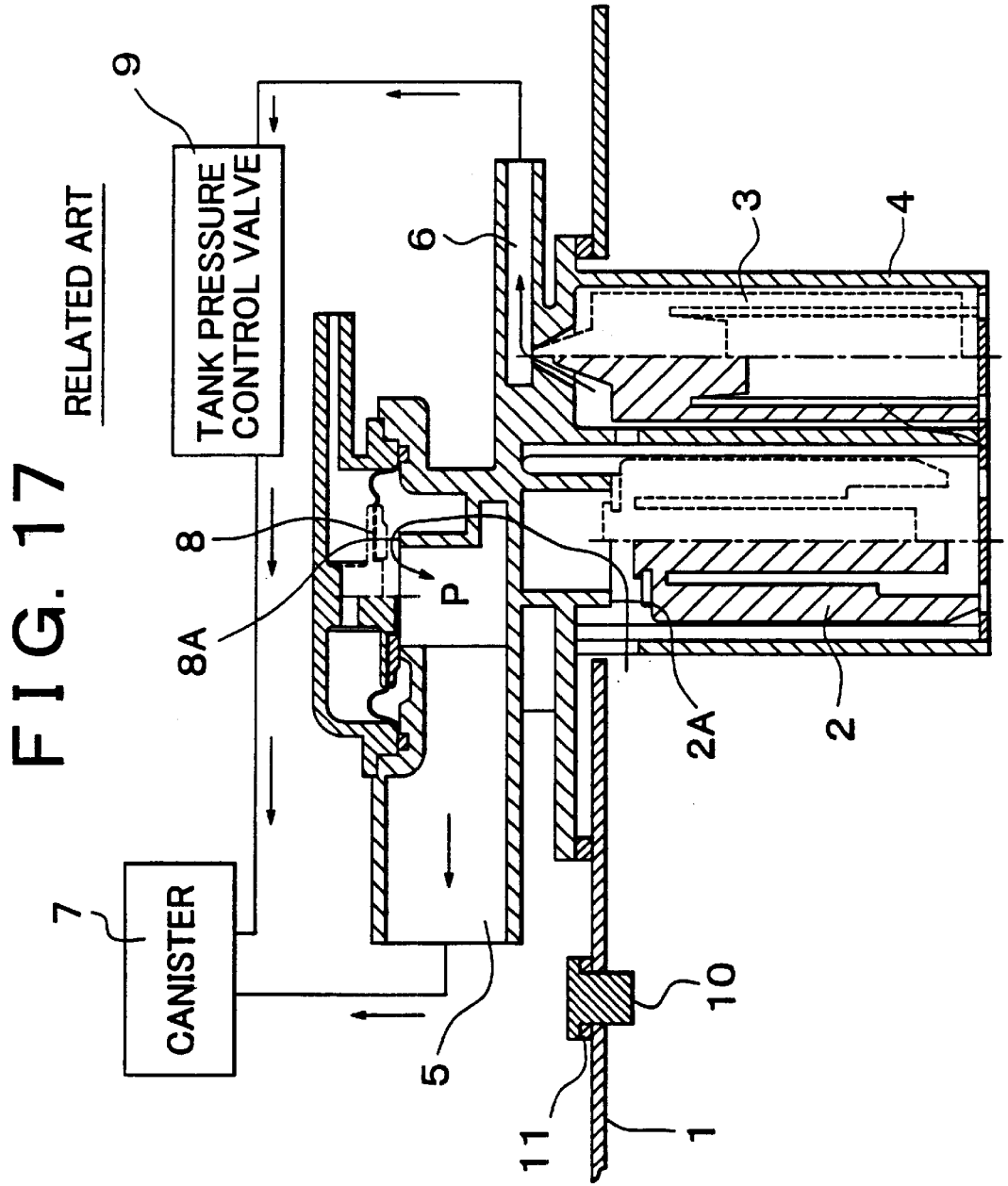
FIG. 17 is a cross sectional view of a fuel evaporative emission controller of a related art.
Figure 18:
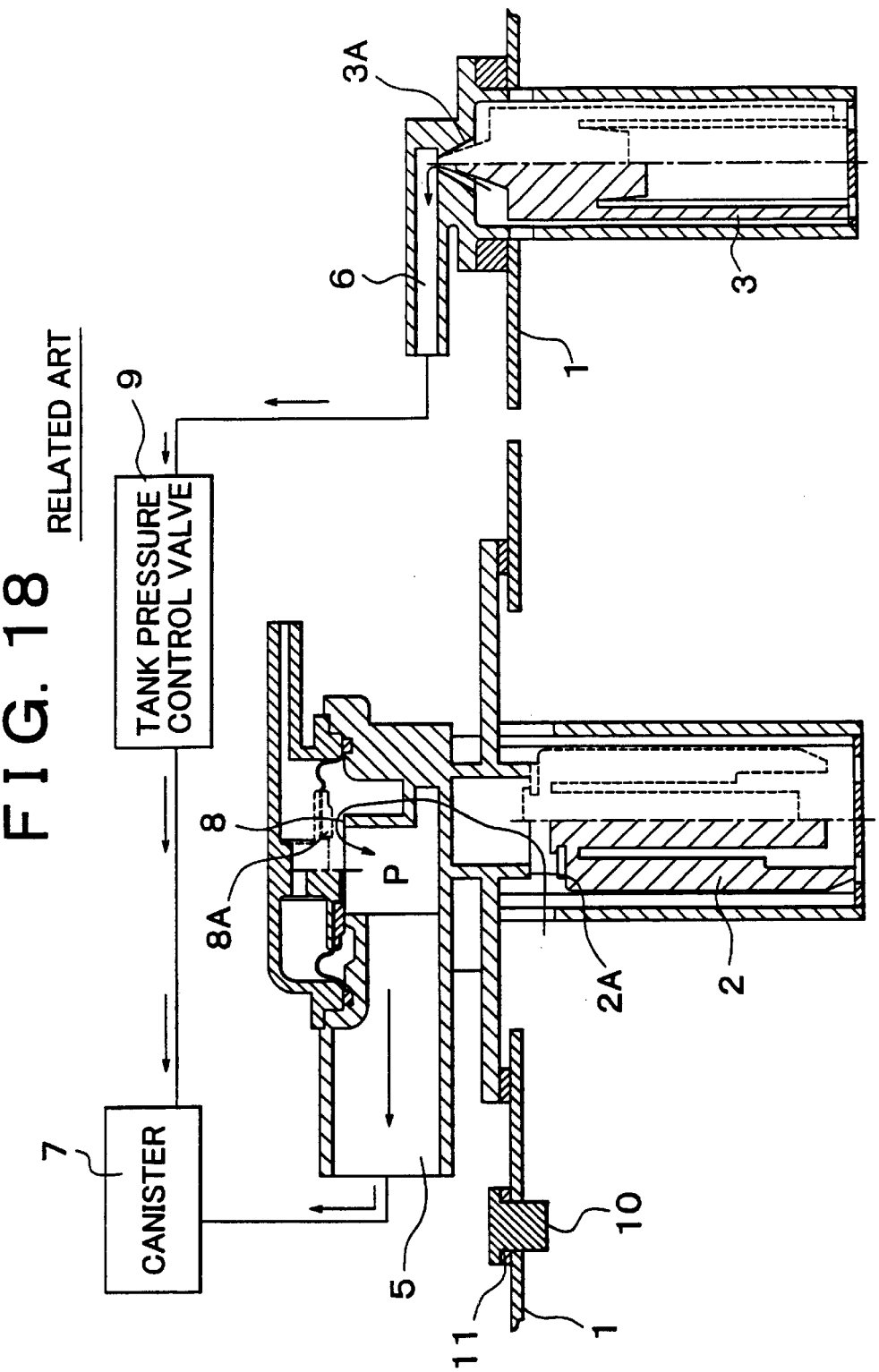
FIG. 18 is a cross sectional view of a fuel evaporative emission controller of another related art.

In Embodiment 15 shown in FIG. 15, two fuel cut valves 33 are provided separately from the valve structure 34.

In Embodiment 15, a first fuel cut valve 33C is provided with a connection port 51 for connecting the evaporate lines 36 with each other. The connection port 51 communicates with the evaporate line 36 of the fuel cut valve 33C. The evaporate line 36 is connected to the connection port 41 of the fuel-level sensing valve 32 provided in the valve structure 34. The evaporate line 36 of a second fuel cut valve 33D is connected to the connection port 51 of the first fuel cut valve 33C.

In Embodiment 15, a separately placed fuel cut valve is provided with a connection port so that the connection port is connected to the evaporate line of another fuel cut valve. As a result, the piping can be simplified, and consumption thereof can be reduced. Thus, fuel-gas emission due to the permeation can be reduced.

Like the foregoing embodiments, the diaphragm valve 38 may be omitted in Embodiment 15.

Hereinafter, Embodiment 16 of the invention is described.

In each of the foregoing embodiments, the fuel evaporative emission controller is partially exposed outside the fuel tank. In Embodiment 16, however, the fuel evaporative emission controller is mounted entirely within the fuel tank.

More specifically, after the components such as fuel-level sensing valve 32 and fuel cut valve 33 are mounted to the fuel tank 31, they are entirely covered by a cover 58. In this case, the vent line 35 communicating with the canister 37, as well as the wiring and piping required for the control operation, may partially extend outside the cover 58.

According to Embodiment 16, fuel-gas emission due to the permeation can further be reduced.

As has been described above, according to the invention, the piping such as rubber hoses and the number of joints thereof are minimized, whereby the assembling time as well as the cost for the rubber hoses and the like are reduced.

Moreover, since a plurality of valves are integrated, or the use of the rubber hoses and the number of attachment positions thereof are minimized, the quantity of fuel gas permeating through the piping is reduced.

Furthermore, since the valves and the like are integrated, the fuel tank is not required to have a large opening, and also, the number of O-rings for sealing as well as the total length are reduced. As a result, permeation of the fuel gas is reduced.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the invention.

What is claimed is:

1. A fuel evaporative emission controller, comprising:
    a valve structure including at least a fuel-level sensing valve and a first fuel cut valve;
    a vent line provided in the valve structure;
    an evaporate line provided in the valve structure, wherein the vent line and the evaporate line communicate with each other within the valve structure; and
    a control valve for opening and closing the evaporate line.

2. The fuel evaporative emission controller according to claim 1, further comprising a pressure sensor for detecting a pressure in a fuel tank, wherein the control valve is an electromagnetic valve.

3. A fuel evaporative emission controller, comprising:
    a valve structure including at least a fuel-level sensing valve and a first fuel cut valve;
    a vent line provided in the valve structure;
    an evaporate line provided in the valve structure, wherein the vent line and the evaporate line communicate with each other within the valve structure;
    a second fuel cut valve; a connection port for communicating the evaporate line and an evaporate line of the second fuel cut valve with each other; and
    a control valve for opening and closing the evaporate line and the evaporate line of the second fuel cut valve.

4. A fuel evaporative emission controller, comprising:
    a valve structure including at least a fuel-level sensing valve and a first fuel cut valve;
    a vent line provided in the valve structure;
    an evaporate line provided in the valve structure, wherein the vent line and the evaporate line communicate with each other within the valve structure; and
    a diaphragm valve for controlling communication between the vent line and a fuel tank.

5. The fuel evaporative emission controller according to claim 4, further comprising a fuel-collecting portion formed downstream of the vent line, wherein the fuel-collecting portion communicates with a fuel tank.

6. The fuel evaporative emission controller according to claim 4, further comprising a valve seat provided upward of the fuel-level sensing valve, wherein the vent line and the valve seat communicate with each other.

7. A fuel evaporative emission controller, comprising:
    a valve structure including at least a fuel-level sensing valve;
    at least one fuel cut valve;
    a vent line provided in the valve structure;
    an evaporate line provided in the valve structure, wherein the vent line and the evaporate line communicate with each other within the valve structure; and
    a control valve for opening and closing the evaporate line.

8. The fuel evaporative emission controller according to claim 7, further comprising a pressure sensor for detecting a pressure in a fuel tank, wherein the control valve is an electromagnetic valve.

9. A fuel evaporative emission controller, comprising:
    a valve structure including at least a fuel-level sensing valve;
    at least one fuel cut valve;
    a vent line provided in the valve structure;
    an evaporate line provided in the valve structure, wherein the vent line and the evaporate line communicate with each other within the valve structure;
    a second fuel cut valve;
    a connection port for communicating the evaporate line and an evaporate line of the fuel cut valve with each other; and
    a control valve for opening and closing the evaporate line and the evaporate line of the fuel cut valve.

10. A fuel evaporative emission controller, comprising:
    a valve structure including at least a fuel-level sensing valve;
    at least one fuel cut valve;
    a vent line provided in the valve structure;
    an evaporate line provided in the valve structure, wherein the vent line and the evaporate line communicate with each other within the valve structure; and
    a diaphragm valve for controlling communication between the vent line and a fuel tank.

11. The fuel evaporative emission controller according to claim 10, further comprising a fuel-collecting portion formed downstream of the vent line, wherein the fuel-collecting portion communicates with a fuel tank.

12. The fuel evaporative emission controller according to claim 10, further comprising a valve seat provided upward of the fuel-level sensing valve, wherein the vent line and the valve seat communicate with each other.

13. A fuel tank, comprising:
    a valve structure including at least a fuel-level sensing valve and a first fuel cut valve;
    a vent line provided in the valve structure;
    an evaporate line provided in the valve structure, wherein the vent line and the evaporate line communicate with each other within the valve structure; and
    a control valve for opening and closing the evaporate line.

14. A fuel tank comprising:
    a valve structure including at least a fuel-level sensing valve and a first fuel cut valve;
    a vent line provided in the valve structure;
    an evaporate line provided in the valve structure, wherein the vent line and the evaporate line communicate with each other within the valve structure; and
    a diaphragm valve for controlling communication between the vent line and a fuel tank.

15. A fuel tank comprising:
    a valve structure including at least a fuel-level sensing valve and a first fuel cut valve;
    a vent line provided in the valve structure;
    an evaporate line provided in the valve structure, wherein the vent line and the evaporate line communicate with each other within the valve structure;
    a second fuel cut valve;
    a connection port for communicating the evaporate line and an evaporate line of the second fuel cut valve with each other; and
    a control valve for opening and closing the evaporate line and the evaporate line of the second fuel cut valve.

* * * * *